(12) United States Patent
Pohlen et al.

(10) Patent No.: US 12,319,032 B2
(45) Date of Patent: Jun. 3, 2025

(54) LAMINATED GLAZING HAVING AN INFORMATION ACQUISITION SYSTEM VIEWING AREA

(71) Applicant: ACR II GLASS AMERICA INC., Nashville, TN (US)

(72) Inventors: Markus Walter Pohlen, Mückeln (DE); Steven Scott Christman, Nashville, TN (US); Emily Anne Curtis, Nashville, TN (US); Yu Matsuda, Nashville, TN (US)

(73) Assignee: ACR II GLASS AMERICA INC., Nashville, TN (US)

( * ) Notice: Subject to any disclaimer, the term of this patent is extended or adjusted under 35 U.S.C. 154(b) by 0 days.

(21) Appl. No.: 17/786,776

(22) PCT Filed: Dec. 18, 2020

(86) PCT No.: PCT/US2020/065958
§ 371 (c)(1),
(2) Date: Jun. 17, 2022

(87) PCT Pub. No.: WO2021/127399
PCT Pub. Date: Jun. 24, 2021

(65) Prior Publication Data
US 2023/0016180 A1 Jan. 19, 2023

Related U.S. Application Data

(60) Provisional application No. 62/950,523, filed on Dec. 19, 2019.

(51) Int. Cl.
*B32B 17/10* (2006.01)
*B32B 7/12* (2006.01)
(Continued)

(52) U.S. Cl.
CPC .. *B32B 17/10348* (2013.01); *B32B 17/10899* (2013.01); *B32B 7/12* (2013.01);
(Continued)

(58) Field of Classification Search
CPC ....................................................... B32B 17/10
(Continued)

(56) References Cited

U.S. PATENT DOCUMENTS 5,153,751 A * 10/1992 Ishikawa ............ G02B 27/0103
359/24
6,166,834 A * 12/2000 Taketomi ................ G02B 6/005
349/86

(Continued)

FOREIGN PATENT DOCUMENTS

| JP | 3034997 B2 | 4/2000 |
|----|------------|--------|
| WO | 97/01133 A1 | 1/1997 |
| WO | 2019/147605 A1 | 8/2019 |

OTHER PUBLICATIONS

International Search Report and Written Opinion of the International Searching Authority for International Application No. PCT/US20/65958, filed Dec. 18, 2020, mailed on Mar. 23, 2021, by the United States Patent and Trademark Office, 12 pages.

(Continued)

*Primary Examiner* — Tahseen Khan
(74) *Attorney, Agent, or Firm* — K&L Gates LLP; Shu Chen (57) ABSTRACT

A laminated glazing to be used with an information acquisition system includes a first glass sheet; a first interlayer; a photopolymer film; a second interlayer; a second glass sheet; and a first information acquisition system viewing area for transmitting information to be collected by the information (Continued)

acquisition system wherein the photopolymer film provides an evenly patterned area in the first information acquisition system viewing area.

21 Claims, 6 Drawing Sheets (51) Int. Cl.
*B32B 27/30* (2006.01)
*B32B 27/36* (2006.01)
*B32B 27/40* (2006.01)
*B32B 37/00* (2006.01)
*G02B 27/01* (2006.01)

(52) U.S. Cl.
CPC ............ *B32B 27/30* (2013.01); *B32B 27/306* (2013.01); *B32B 27/36* (2013.01); *B32B 27/365* (2013.01); *B32B 27/40* (2013.01); *B32B 37/003* (2013.01); *B32B 2250/40* (2013.01); *B32B 2255/10* (2013.01); *B32B 2255/26* (2013.01); *B32B 2307/418* (2013.01); *B32B 2315/08* (2013.01); *B32B 2329/06* (2013.01); *B32B 2367/00* (2013.01); *B32B 2369/00* (2013.01); *B32B 2375/00* (2013.01); *B32B 2551/00* (2013.01); *G02B 27/0103* (2013.01)

(58) Field of Classification Search
USPC .......................................................... 428/38
See application file for complete search history.

(56) References Cited

U.S. PATENT DOCUMENTS

| | | |
|---|---|---|
| 2002/0163681 A1 | 11/2002 | Taggi et al. |
| 2008/0079880 A1 | 4/2008 | Mochizuki et al. |
| 2014/0162178 A1 | 6/2014 | Na |
| 2017/0212289 A1* | 7/2017 | Wiltshire ............. G03H 1/0248 |
| 2019/0101865 A1* | 4/2019 | Popkova .......... B32B 17/10724 |
| 2019/0250561 A1 | 8/2019 | Tsen |

OTHER PUBLICATIONS

Beeck, et al. "Holographic mirrors laminated into windshields for automotive Head-Up Display and solar protective glazing applications." SPIE vol. 1507 Holographic Optics III: Principles and Applications. pp. 394-406. 1991.

Bruder, et al. "Mass Production of Volume Holographic Optical Elements (vHOEs) using Bayfol® HX Photopolymer Film in a Roll-to-Roll Copy Process." Practical Holography XXXI: Materials and Applications, Proc. of SPIE vol. 10127, 101270A, pp. 101270A-1 to 101270A-20. 2017.

* cited by examiner

LAMINATED GLAZING HAVING AN INFORMATION ACQUISITION SYSTEM VIEWING AREA

CROSS REFERENCE TO RELATED APPLICATION

This application is a national stage of PCT International Application No. PCT/US2020/065958, filed on Dec. 18, 2020, and claims priority to U.S. Provisional Application No. 62/950,523 filed on Dec. 19, 2019, entitled "LAMINATED GLAZING HAVING AN INFORMATION ACQUISITION SYSTEM VIEWING AREA", the entire contents of which are incorporated by reference herein in their entirety.

TECHNICAL FIELD

The present disclosure generally relates to laminated glazings having an information acquisition system viewing area and a holographic film laminated therein.

BACKGROUND

Information acquisition systems may be mounted inside a vehicle for improving safety performance and comfort of a vehicle. An information acquisition system may typically include imaging systems, anti-collision systems, brake assisting systems, driving assistance systems, and/or auto-driving systems using various electric sensors and/or cameras.

The electric sensors or cameras in information acquisitions systems are typically mounted directly on an inner surface of laminated vehicle windshield or positioned near a vehicle windshield. The sensors or cameras collect information or data regarding conditions outside of a vehicle by emitting and/or detecting infrared rays, near infrared rays, laser radar and/or visible light through a windshield.

Some vehicles may further have head-up display (HUD) functionality. HUD systems are used in vehicles to project an image which a driver may see without looking away from the vehicle windshield. Particularly, a HUD system typically includes a projector and reflects a projected image from a windshield to provide an image for a driver. However, a windshield has two reflective surfaces in the inner and outer glass surfaces which may each create a reflected image. One of the reflected images may be weaker and is known as a "ghost image" which may lead to the driver perceiving a hazy or double image.

Wedge-shaped interlayers have been used to align the images by adjusting the reflective point of the "ghost image" to match the reflection of the stronger image, creating a single image for the driver. However, a wedge-shaped interlayer is not adjustable and the images may be aligned only for drivers at a particular height. There is a need in the art for windshields having HUD capabilities for drivers with a range of heights.

One possible solution is to use a p-polarized projector and a laminated film which reflects p-polarized light. Being near the Brewster angle, the glass surface reflections will not generate ghost images. Another possible solution is to use a p- or s-polarized projector and a laminated film comprising a halfwave retarder. Being near Brewster angle, depending on the projector light polarization, only the inner or outer glass surface may reflect light. Laminating a film however may have the problem of wrinkles or short range deviations of the reflecting film surface which cause distortions in the HUD image.

There is a desire for HUD systems with larger HUD images which may require large projector apertures which are limited by available space in the vehicle dashboard. By using a holographic film, which has focusing power (i.e., concave mirror feature), smaller projector sizes can be used.

The holographic film may be laminated to or in a glazing, as described in Manfred-Andreas Beeck et al., *Holographic mirrors laminated into windshields for automotive Head-Up Display and solar protective glazing applications*, 1507 Proc. SPIE 394 (1991). However, the holographic films may affect the information acquisition system collection of information where the holographic film is provided in the viewing area of the information acquisition system. It is desired to provide a glazing having functionality for HUD and information acquisition systems.

SUMMARY OF THE DISCLOSURE

Disclosed herein is a laminated glazing comprising: a first glass sheet; a first interlayer; a photopolymer film; a second interlayer; and a second glass sheet, wherein the laminated glazing comprises a first information acquisition system viewing area, and the first information acquisition system viewing area comprises an evenly patterned area.

According to the disclosure, one or more information acquisition system viewing areas may be provided for one or more the information acquisition systems. A plurality of information acquisition system viewing areas may be connected or separated with each other. A border region may be formed at an edge of an evenly patterned area in the photopolymer film for reducing an index of refraction and/or index of refraction pattern gap at the border region.

In another aspect of the disclosure, a method of preparing a laminated glazing includes: aligning a laminated glazing, which comprises a first glass sheet, a first interlayer, a photopolymer film, a second interlayer, and a second glass sheet, with a master holographic film; applying a first light to the photopolymer film through the master holographic film; and bleaching the laminated glazing with a second light, wherein the laminated glazing comprises a first information acquisition system viewing area, and the first information acquisition system viewing area comprises an evenly patterned area.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Disclosed herein are exemplary aspects of a laminated glazing having an information acquisition system viewing area and a holographic film laminated therein. In the following description, for purposes of explanation, specific details are set forth in order to promote a thorough understanding of one or more aspects of the disclosure. It may be evident in some or all instances, however, that many aspects described below can be practiced without adopting the specific design details described below.

Typically, a laminated glazing may include a first glass sheet, a second glass sheet, and an interlayer laminated therebetween. The glass sheets may include, without limitation, soda-lime silicate glass described by ISO 16293-1: 2008. For various applications, such as a vehicle windshield, the glass sheets may be bent prior to lamination. Preferably, the glass sheets may be bent with heat treatment from 560° C. to 700° C., more preferably from 600° C. to 660° C.

An interlayer may be any suitable material, including a polymer adhesive material, such as polyvinyl butyral (PVB) or ethylene vinyl acetate (EVA), or an ionomer. A laminated glazing including a film, such as a photopolymer film, between glass sheets may include first and second interlayers such that the film is positioned between the first and second interlayers between the glass sheets. In some embodiments, one or both of the first and second interlayers may include an adhesive layer which may be formed on a glass sheet or the film. The interlayer may be stacked between the first and second glass sheets to provide a lamination stack that may be desired prior to autoclaving. Deairing may include mechanical and/or vacuum pressure to remove air from between the glass sheets. Deairing processes may include any suitable means, such as pressure rollers, a vacuum bag, or ring deairing. Vacuum bag deairing may include placing the stack of glass sheets and an interlayer in a vacuum bag and applying vacuum pressure to the system. Ring deairing may include a sealing ring applied around an outer edge of the stack of glass and an interlayer, where the ring may be attachable to a vacuum pump. The deaired materials may be autoclaved, including heat and pressure, to provide a laminated glazing.

A laminated photopolymer film, or holographic film, may be particularly useful in a laminated glazing for HUD applications. A photopolymer film may include a pattern in at least part of the film and may be a holographic film. A laminated film may be surrounded by first and second interlayers between the first and second glass sheets. A HUD film may be used with a projector for displaying an image to a driver. The film may include any suitable material, including a photopolymer, or holographic, film. Particularly, holographic films may be useful for HUD uses in windshields. The holographic film, however, may interfere with an information acquisition system when the holographic film extends through the information acquisition system viewing area.

Figure 1:
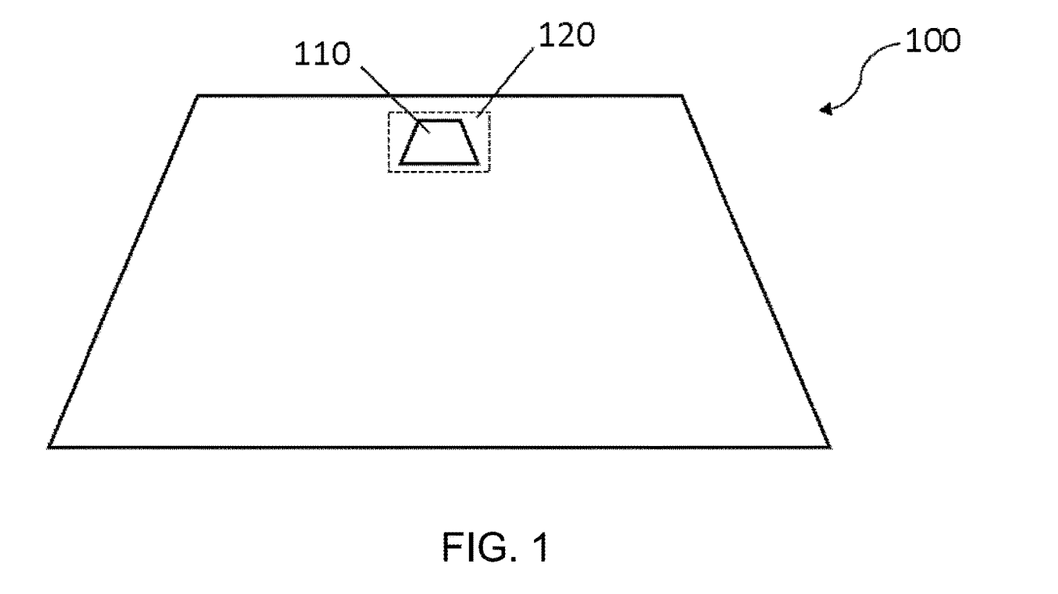
FIG. 1 illustrates a laminated glazing having an information acquisition system viewing area, according to an exemplary embodiment of the present disclosure.

Embodiments described herein may provide a laminated glazing 100 having a photopolymer film, which may include a holographic pattern, and an area of the glazing suitable for an information acquisition system. Particularly, a photopolymer film may be provided which provides a suitable surface in an information acquisition system viewing area 110, as shown in FIG. 1. A typical holographic film may be formed by replication of a master holographic sheet to a photopolymer film. The photopolymer film may include a substrate layer 510, a photopolymer layer, and a cover layer (not pictured in FIGS. 5 and 6). The substrate layer 510 may include any suitable material, such as cellulose triacetate film (TAC), polyethylene terephthalate (PET), polycarbonate (PC), polyurethane (PLT), or others. Preferably, the substrate layer 510 extends over a major portion of the laminated glazing 100. Where a laminated film has an edge within the glazing, distortions may result from lamination due to a change in material thickness in the lamination. Thus, it is preferable to provide the substrate layer 510 of the photopolymer film across a major portion of the laminated glazing to prevent optical distortions in the viewing area of a driver or an information acquisition system. Preferably, the photopolymer film, including the substrate layer 510, may extend across an information acquisition system viewing area 110. A portion of the photopolymer film may be removed at a periphery of the laminated glazing 100 (not shown in the figures). Preferably where an edge of the film is positioned within the glazing, the edge is positioned behind an opaque print which may obscure the film edge and distortion from view.

A photopolymer layer may be coated onto the substrate layer 510 to provide a coated substrate. The cover layer may include polyethylene and may be removed from the film prior to lamination. During replication, the photopolymer layer may react to a light source, having a reactive light wavelength, to provide a pattern in the holographic film. Particularly, the photopolymer layer is sensitive to the light and may have local changes in an index of refraction based on the master holographic film and the reactive light applied thereto. The changes in index of refraction may provide a pattern in the film which may diffract light projected thereon to provide a virtual image viewable by a driver. The pattern may particularly be formed in an area 512 of the photopolymer layer. The area 512 of the photopolymer film having a pattern of index of refraction due to the holographic film may be used for a HUD display for a driver.

The photopolymer may be made from any suitable material capable of recording holograms or particularly, volume holographic optical elements (VOEs), by optical polymerization of monomers and oligomers. A photopolymer may include polymerizing monomers, photopolymerization initiators, and matrix polymers. Polymerizing monomers may include at least one of functional (meth) acrylate, functional (meth) acrylamide, functional (meth) acrylonitrile, and functional (meth) acrylic acid. Generally known photopolymerization initiators may be used without any material limitation and, for example, may include monomolecular initiators bimolecular initiators. Monomolecular initiators may include, for example, triazine, benzophenone, benzoin, and benzyl ketal. Matrix polymers may include, for example, polyurethanes, polyacrylates, and polymethylmethacrylates. A photopolymer used herein may include, for example, Bayfol (Registered trademark) HX made of Covestro LCC.

In addition to a HUD function in a laminated glazing 100, an information acquisition system may collect information through the laminated glazing 100. For example, the information acquisition system may be mounted adjacent to the glazing 100, such as a windshield, for collecting information from an exterior environment. The area of the glazing 100 through which the information acquisition system collects information is referred to herein as an information acquisition system viewing area 110. It may be preferable that the viewing area 110 of the glazing 100 is within an evenly patterned area 120 having a substantially constant index of refraction in a plane of the photopolymer layer where the photopolymer layer extends over the information acquisition system viewing area for improving the light exposure of the information acquisition system and maximizing effectiveness of the information acquisition system. Across such an evenly patterned area 120, the difference between the maximum and the minimum of the index of refraction of the photopolymer layer at a wavelength of 532 nm may be within 0.01, preferably within 0.001 and more preferably within 0.0001. The laminated glazing in the evenly patterned area 120 may have a minimal diffraction efficiency. Preferably the diffraction efficiency is less than 0.1% across the evenly patterned area 120. Diffraction efficiency is measured as a ratio of incident light intensity to an information acquisition system to incident light intensity of diffracted light. The diffraction efficiency may be measured in a light wavelength range including the light wavelengths collected by the information acquisition system associated with the information acquisition system viewing area 110. For example, some information acquisition systems may include a camera collecting information from 400 nm to 800 nm. Some other information acquisition systems may collect information using other wavelength ranges, which may include non-visible light wavelengths. The diffraction efficiency may be less than 0.1% across the entire light wavelength range collected by the information acquisition system. As shown in FIGS. 1-4, the evenly patterned area 120 may be larger than the information acquisition system viewing area 110.

Figure 5:
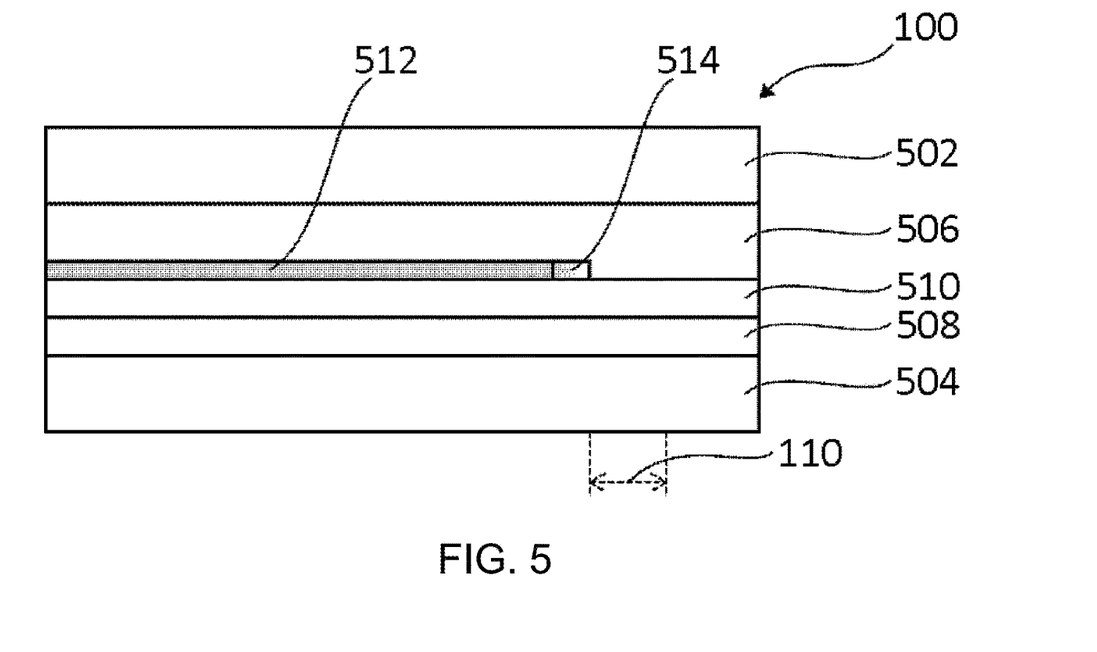
FIG. 5 illustrates a cross section of laminated glazing having a holographic film with a border region according to an exemplary embodiment of the present disclosure.
Figure 6:
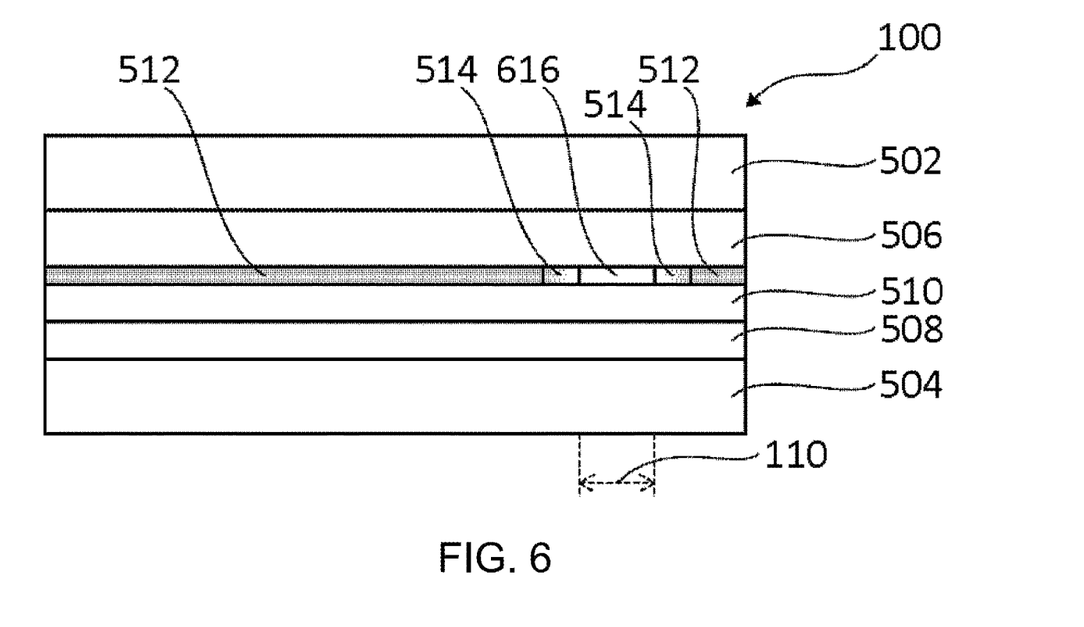
FIG. 6 illustrates a cross section of laminated glazing having a holographic film with a border region and an even pattern region according to an exemplary embodiment of the present disclosure.
Figure 7:
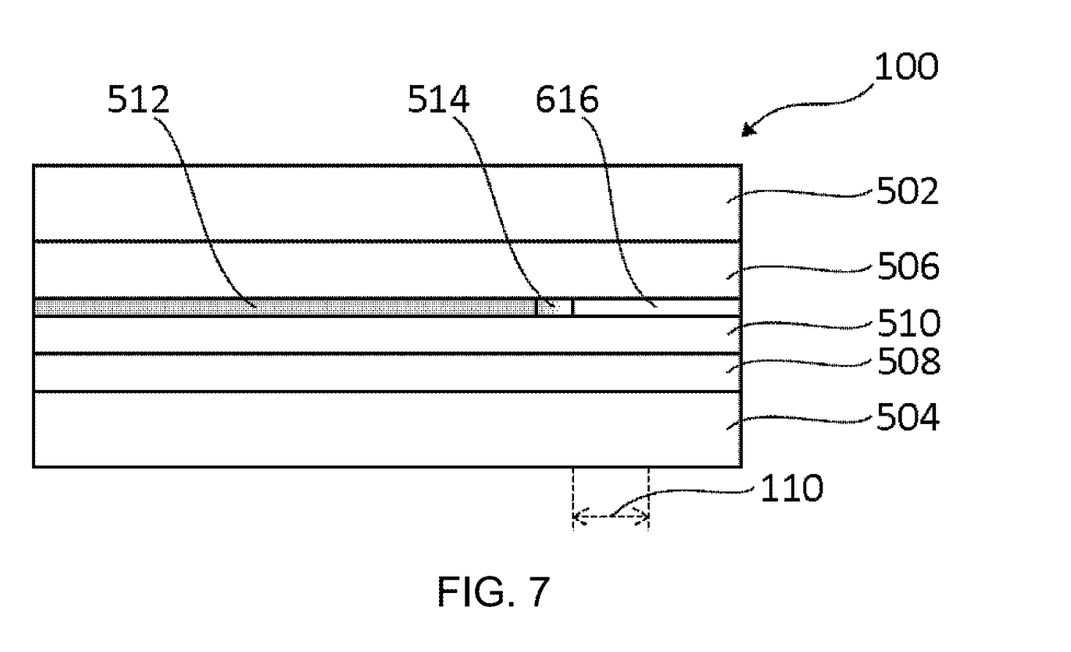
FIG. 7 illustrates a cross section of laminated glazing having a holographic film with a border region and an even pattern region according to an exemplary embodiment of the present disclosure.

A laminated photopolymer film may include a portion for an information acquisition system viewing area 110 which may be prepared by treatment with a consistent reactive light application during replication or otherwise prepared to provide an area with substantially no relative change in index of refraction. The even index of refraction may be formed by a consistent light application which may uniformly affect the photopolymer material. In some embodiments, a master holographic film used for replication may include an evenly patterned portion corresponding to the information acquisition system viewing area 110 through which the light evenly treats the underlying photopolymer layer. In further embodiments, the master holographic film may not overlap with a viewing area 110 and the light may be applied evenly to the photopolymer film directly. In some methods of preparation, the photopolymer film may have an evenly patterned area formed by applying no reactive light to the photopolymer layer in the evenly patterned area, such that the photopolymer layer is not changed prior to bleaching.

Where the area on at least one side of the evenly patterned area 120 has a different or unevenly patterned index of refraction, it may be preferable for a border region 514 of the photopolymer film to provide a gradual change from the area having a different or unevenly patterned to the evenly patterned area index of refraction, as shown in FIGS. 5, 6, and 7. Particularly, an unevenly patterned area of index of refraction may include a difference between a maximum and minimum index of refraction larger than the difference in between a maximum and minimum index of refraction in the evenly patterned area 120, 616. A large step change in index of refraction and/or index of refraction pattern may be more visible to an observer than a small or gradual change in index of refraction and/or index of refraction pattern. Particularly, the larger the change in index of refraction and/or index of refraction pattern, the more visible the change may be to the observer. Thus, the border region 514 which includes the gradual change of index of refraction and/or index of refraction pattern may minimize or eliminate the appearance of the change in pattern and/or index of refraction. A master holographic film used for replication of the photopolymer film may have a design that provides a gradual change in index of refraction and/or index of refraction pattern to provide a border region 514 next to an evenly patterned area 616 or near an edge of the photopolymer material where there is no photopolymer material in the evenly patterned area 120, as shown in FIG. 5. The evenly patterned portion 616 of the photopolymer layer, as shown in FIG. 6, correlates to the evenly patterned area 120 of the laminated glazing. The border region 514 may have a width in a range of 0.5 cm to 5 cm, preferably 1 cm to 3 cm.

Some embodiments having an information acquisition system viewing area 110 may further include an opaque print around the viewing area 110. The opaque print may be any suitable material, including a black enamel frit, and may be provided on any suitable surface, including a glass sheet surface or a laminated film surface. Particularly, the printing may be provided around a viewing area 110. Where the opaque print is provided between an outer glazing surface and the laminated photopolymer film, the print may block from view an edge of the viewing area 110, such that the edge of an even index of refraction in the viewing area 110 may not be visible whether or not it includes a border region 514 with a gradual change in index of refraction.

Figure 4:
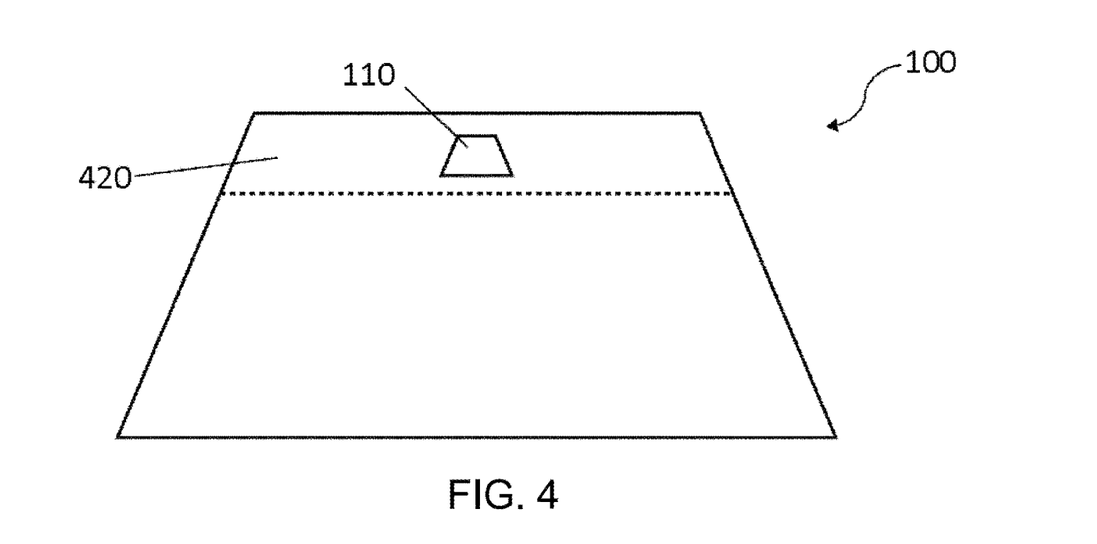
FIG. 4 illustrates a laminated glazing having an information acquisition system viewing area, according to an exemplary embodiment of the present disclosure.

As disclosed herein, an evenly patterned area 120 for an information acquisition system viewing area 110 may be formed with a photopolymer layer having consistent reactive light application or no reactive light application followed by bleaching of the photopolymer material. An even pattern of index of refraction may further be provided by a holographic film which has a portion at least correlating to the information acquisition system viewing area 110 without a photopolymer layer. The substrate layer 510 may continue in the evenly patterned area, including the information acquisition system viewing area 110, as shown in FIG. 5. As shown in FIG. 4, a portion 420 of the glazing may be provided without the photopolymer layer on the substrate film 510 which may extend from one glazing edge to an opposite glazing edge. In further embodiments, the evenly patterned area 420 may be formed by a consistent light application or no light application where a photopolymer layer is provided in the evenly patterned area 420.

FIG. 5 illustrates the holographic film which may be laminated in a glazing 100 wherein a portion of the substrate layer 510 is not coated with the photopolymer layer. The film may be provided in a roll which is unrolled and portioned for lamination between glass substrates. The film may be provided such that a portion of the roll does not include the photopolymer layer. The laminated glazing 100 may have a structure including a first glass sheet 502, a first interlayer 506, a photopolymer film including the substrate layer 510, a second interlayer 508, and a second glass sheet 504. The substrate layer 510 may include a portion covered with a photopolymer layer, which may at least partially include a holographic pattern therein. The substrate layer 510 portion without the photopolymer layer may provide an evenly patterned area 420 in a glazing and correspond at least to the information acquisition system viewing area 110 serving as an opening for information acquisition system. In the laminated glazing 100, the uncoated portion of the substrate film 510 may extend across the glazing 100 between opposite edges of the glazing 100. In a recordation process, the photopolymer layer reacts to a reactive light and an uneven, or non-uniform, holographic pattern may be recorded in the holographic patterned area 512. The patterned holographic area 512 may include a border region 514 having a gradual change in index of refraction and/or index of refraction pattern which may minimize the appearance of the edge of the unevenly patterned holographic area 512. The edge of the photopolymer layer may be replicated using a master holographic film to provide a gradual change in index of refraction and/or index of refraction pattern from the patterned holographic area 512 of the film to the uncoated substrate portion of the film. Preferably, the border region 514 between an uncoated portion of the substrate film 510 and the patterned holographic area 512 may be above the driver's viewing region of a glazing. For example, the border region 514 may preferably be at or above the AS1 line on a windshield. Preferably, the area of a glazing 100 used for HUD is below the border region 514 such that the holographic film laminated in the glazing 100 may provide a holographic patterned surface 514 for HUD projection.

FIG. 6 shows another laminated glazing 100 formed with an evenly patterned area 616 in a photopolymer film. The evenly patterned area 616 may be formed in the photopolymer film at least in an area corresponding to the position of the information acquisition system viewing area 110. A border region 514 with a gradual change in index of refraction and/or index of refraction pattern may be provided along the evenly patterned area 616 such that the evenly patterned area 616 may be bounded, surrounded, or partially surrounded by the border region 514. The border region 514 may be positioned between the evenly patterned area 616 and the patterned holographic area 512.

The laminated glazing 100 may include a first glass sheet 502, a first interlayer 506, the photopolymer film which includes the patterned holographic area 512, the border region 514, and the evenly patterned area 616, a second interlayer 508, and a second glass sheet 504. The photopolymer film may include a substrate layer 510 and a photopolymer material layer. The photopolymer film may be positioned such that the photopolymer material faces either the first glass sheet 502 or the second glass sheet 504. As described above, the evenly patterned area 616 of the photopolymer film may be formed by light application or avoidance to the photopolymer film. The patterned holographic area 512 may be formed with a border region 514 which may have a gradual change in index of refraction and/or index of refraction pattern which may minimize the appearance of the edge of the patterned holographic area 512.

FIG. 7 shows another laminated glazing 100 formed with an evenly patterned area 120. The evenly patterned area 120 may be formed at least in an area 616 of the photopolymer film having an even pattern of index of refraction and corresponding to the position of the information acquisition system viewing area 110. The laminated glazing 100 shown in FIG. 7 has a structure similar to the structure shown in FIG. 6, including a portion corresponding to the information acquisition system viewing area 110. The border region 514 may be arranged at the edge of the patterned holographic area 512 without surrounding the evenly patterned area 616 of the photopolymer film in some embodiments.

Figure 8:
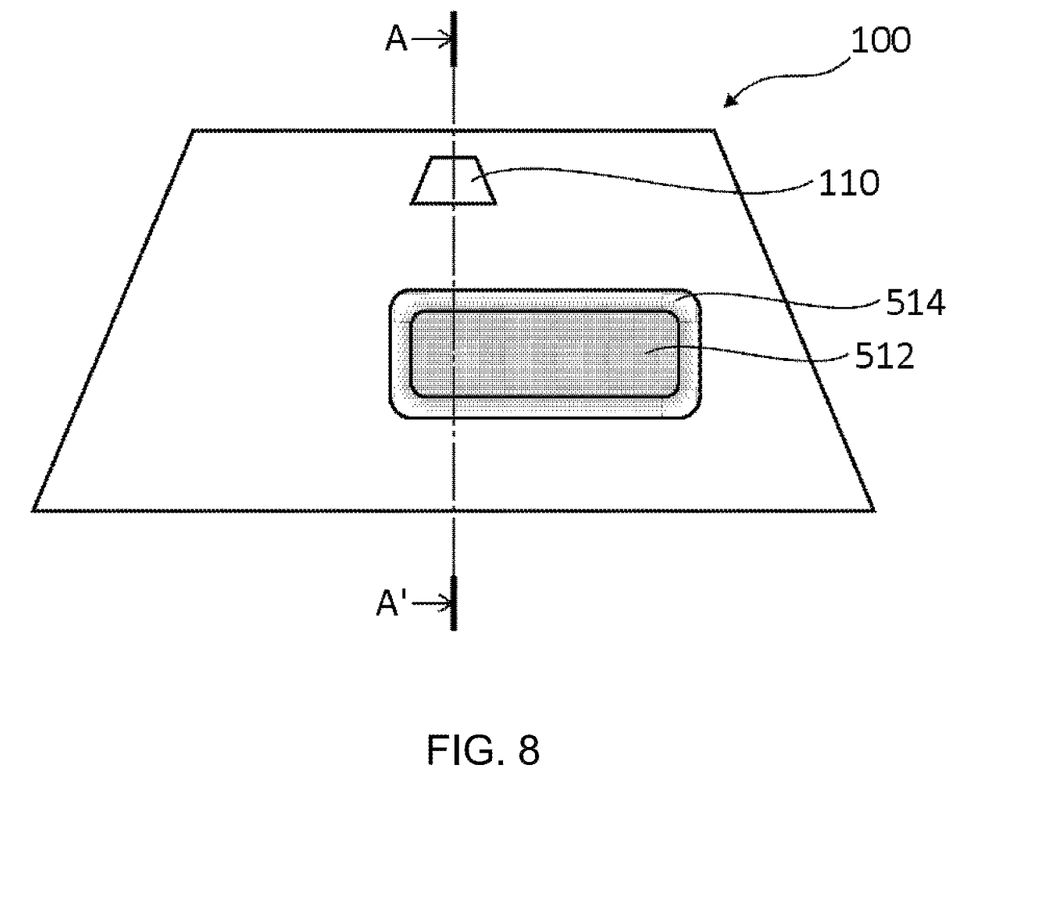
FIG. 8 is a plan view of a laminated glazing having a holographic film with a border region and an even pattern region according to an exemplary embodiment of the present disclosure.
Figure 9:
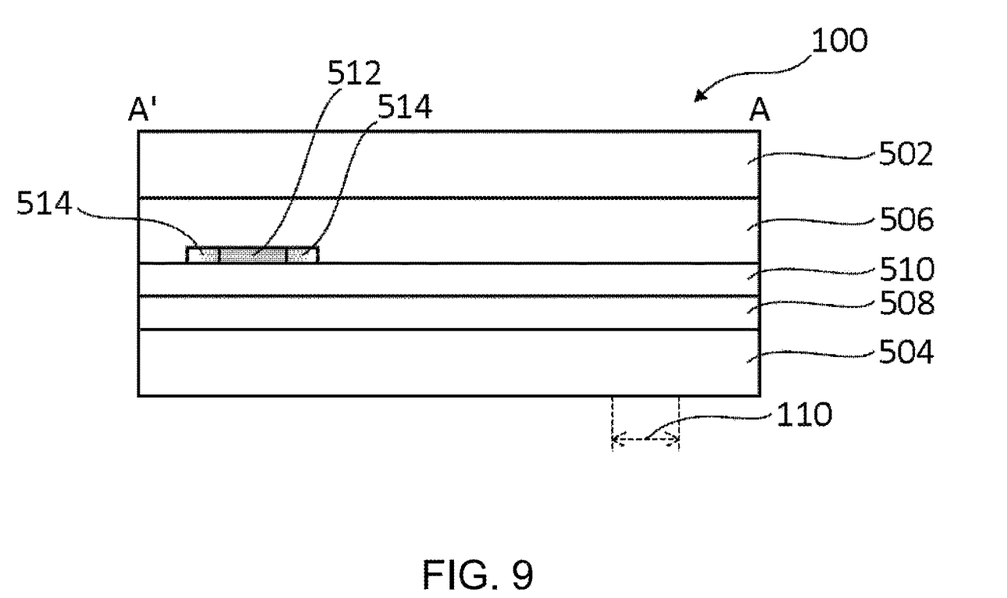
FIG. 9 illustrates a cross section of laminated glazing having a holographic film with a border region according to an exemplary embodiment of the present disclosure.

FIG. 8 and FIG. 9 illustrate yet another laminated glazing 100 formed with a photopolymer film which includes the patterned holographic area 512 and the border region 514 around the patterned holographic area 512 in an island shape. In FIG. 8, the island shape is a rectangular shape with four rounded corners. The patterned holographic area 512 may be surrounded by the border region 514 for reducing the index of refraction and/or index of refraction pattern gap between the patterned holographic area 512 and the surrounding evenly patterned area. The information acquisition system viewing area 110 may be provided at a portion of the glazing not overlapping with the island-shaped patterned holographic area 512. In some further embodiments, the photopolymer layer of the photopolymer film may extend beyond the patterned holographic area 512.

Figure 2:
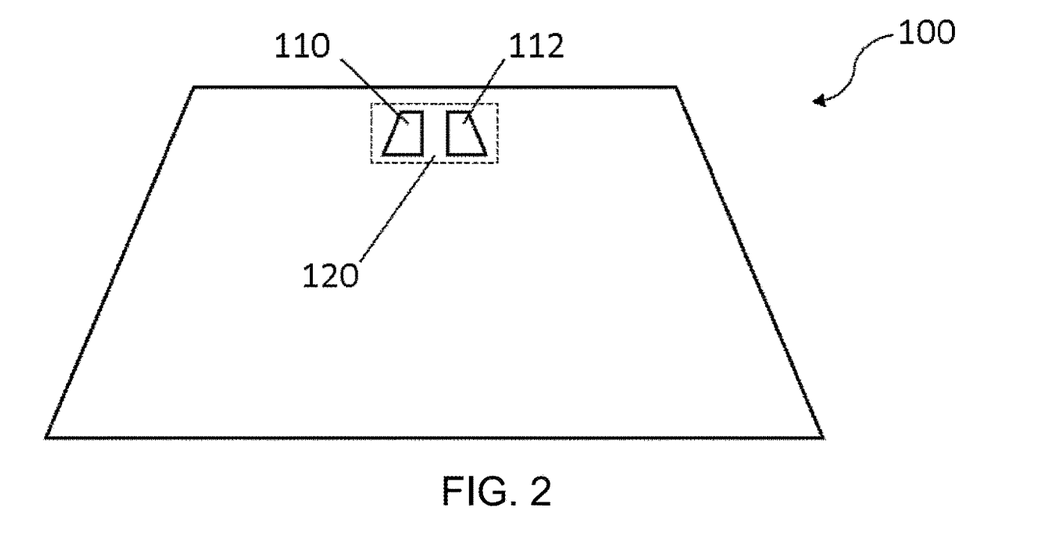
FIG. 2 illustrates a laminated glazing having information acquisition system viewing areas, according to an exemplary embodiment of the present disclosure.
Figure 3:
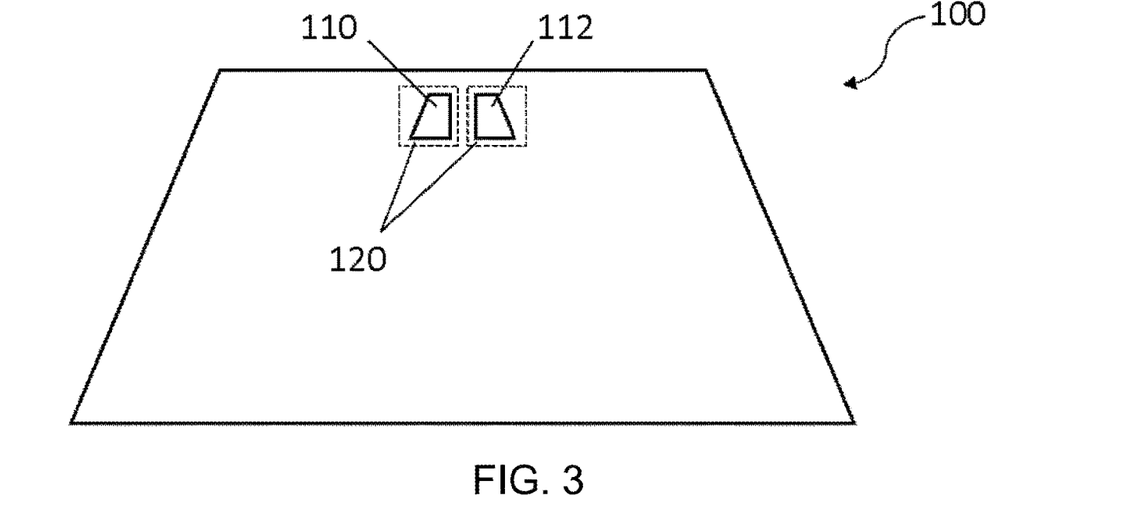
FIG. 3 illustrates a laminated glazing having information acquisition system viewing areas, according to an exemplary embodiment of the present disclosure.

A glazing 100 may include one or more information acquisition system viewing areas 110, 112. Multiple information acquisition system viewing areas 110, 112 in a single laminated glazing, as shown in FIGS. 2 and 3, may be used for the same or different information acquisition systems. For example, an information acquisition system may include multiple cameras which work in stereo and require at least two viewing areas 110, 112 for the system. Further examples may include at least one camera and a rain sensor which may require separate viewing areas 110, 112. Where there is more than one information acquisition system, the viewing areas 110, 112 associated with each system may be the same or different shape and size. Further, where the viewing areas 110, 112 are for the same system, they may be the same or different in shape and size. A laminated film may include an evenly patterned area 120 over the viewing areas may be continuous over more than one information acquisition system viewing area 110, 112, as shown in FIG. 2. In some further examples, there may be separate evenly patterned areas 120 for each information acquisition system viewing area 110, 112 such that the evenly patterned areas 120 are separated by an area of the laminated film having a holographic pattern as shown in FIG. 3.

In some examples, particularly where the evenly patterned portion of the photopolymer film includes the photopolymer layer, the evenly patterned portion of the photopolymer film may be prepared by a method of replicating a holographic film. A method of replicating the holographic film may include the steps of aligning a laminated glazing with a master holographic film; applying a first light to a photopolymer film through the master holographic film at an angle, wherein an information acquisition system viewing area in the laminated glazing is exposed to a consistent application of the first light to create a flat pattern in the information acquisition system viewing area; and bleaching the laminated glazing with a second light. In some alternative embodiments, the information acquisition system viewing area may not be exposed to the first light and the photopolymer layer in the information acquisition system viewing area may maintain an even pattern.

In some embodiments, the photopolymer film which may be laminated in a glazing for HUD applications may be prepared by a beam recordation process. Typical beam recordation processes may include applying multiple interfering light beams to a photopolymer film of the laminate glazing, resulting in the formation of the hologram based on an interference pattern within the recorded photopolymer film. The light beams can be laser light beams, emitting coherent and monochromatic laser light when recording the hologram. The process of forming the holographic film may further include, after the photopolymer film is treated with the reactive light, treating the glazing, including the photopolymer film, with a bleaching light such that the photopolymer film is no longer reactive to the reactive light and may keep its pattern.

In some embodiments, the reactive light (the first light) may have a wavelength in the range of 200 nm to 780 nm, more preferably 300 nm to 700 nm, and even more preferably from 380 nm to 680 nm. The reactive light has a wavelength different from that of the bleaching light (the second light). At least one of the reactive light and the bleaching light may preferably include light having a wavelength in an ultraviolet light wavelength range of from 250 nm to 400 nm.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A laminated glazing, comprising:
a first glass sheet;
a first interlayer;
a photopolymer film, wherein the photopolymer film includes a substrate layer and a photopolymer layer on at least a portion of the substrate layer;
a second interlayer;
a second glass sheet,
wherein the laminated glazing comprises a first information acquisition system viewing area, and
wherein the first information acquisition system viewing area comprises a first evenly patterned area; and
a border region positioned between and adjacent the first evenly patterned area and the photopolymer film, wherein an index of refraction of the border region changes gradually from a first value to a second value, a difference between the first and second values corresponding to a step change in index of refraction between the first evenly patterned area and the photopolymer film.

2. The laminated glazing according to claim 1, wherein the photopolymer layer is formed with an even pattern in the first information acquisition system viewing area.

3. The laminated glazing according to claim 1, further comprising a second information acquisition system viewing area, wherein the second information acquisition system viewing area includes a second evenly patterned area.

4. The laminated glazing according to claim 3, wherein the first evenly patterned area is not continuous with the second evenly patterned area.

5. The laminated glazing according to claim 3, wherein the first evenly patterned area is continuous with the second evenly patterned area.

6. The laminated glazing according to claim 1, wherein the laminated glazing comprises a first edge and a second edge wherein the laminated glazing extends between the first edge and the second edge, and wherein the first evenly patterned area extends from the first edge to the second edge.

7. The laminated glazing according to claim 1, wherein the border region is configured to a gap in index of refraction and/or index of refraction pattern between at least one edge of the first evenly patterned area and a different or unevenly patterned area of the photopolymer film.

8. The laminated glazing according to claim 7, wherein the first evenly patterned area is surrounded by the border region.

9. The laminated glazing according to claim 1, wherein an opaque print surrounds the first information acquisition system viewing area.

10. The laminated glazing according to claim 1, wherein the photopolymer layer does not extend into the first evenly patterned area.

11. The laminated glazing according to claim 10, wherein the photopolymer film includes an edge of the photopolymer layer, and wherein the edge includes the border region for reducing a gap in index of refraction and/or index of refraction pattern between an area of the photopolymer layer and the first evenly patterned area.

12. The laminated glazing according to claim 11, wherein the photopolymer layer is provided in the photopolymer film as an island on the substrate layer.

13. The laminated glazing according to claim 1, wherein the photopolymer film extends through the first information acquisition system viewing area.

14. A method of preparing a laminated glazing, comprising:
aligning a laminated glazing, which comprises a first glass sheet, a first interlayer, a photopolymer film having a substrate layer and a photopolymer layer, a second interlayer, and a second glass sheet, with a master holographic film;
applying a first light to the photopolymer film through the master holographic film; and
bleaching the laminated glazing with a second light;
wherein the laminated glazing comprises a first information acquisition system viewing area, and the first information acquisition system viewing area comprises an evenly patterned area,
wherein the laminated glazing further comprises a border region positioned between and adjacent the evenly patterned area and the master holographic film, wherein an index of refraction of the border region changes gradually from a first value to a second value, a difference between the first and second values corresponding to a step change in index of refraction between the evenly patterned area and the master holographic film.

15. The method of preparing the laminated glazing according to claim 14, wherein the first information acquisition system viewing area is formed at an area of the laminated glazing at which the photopolymer layer is provided and is exposed to a consistent application of the first light to create the evenly patterned area in the first information acquisition system viewing area.

16. The method of preparing the laminated glazing according to claim 15, wherein the master holographic film overlaps with the information acquisition system viewing area.

17. The method of preparing the laminated glazing according to claim 15, wherein the master holographic film does not overlap with the information acquisition system viewing area.

18. The method of preparing the laminated glazing according to claim 14, wherein the first information acquisition system viewing area is formed at an area of the laminated glazing at which the photopolymer layer is provided and is not exposed to the first light.

19. The method of preparing the laminated glazing according to claim 14, wherein the border region is positioned to adjacent at least one edge of the evenly patterned area and the master holographic film.

20. The method of preparing the laminated glazing according to claim 14, wherein the first information acquisition system viewing area is formed in an area of the photopolymer film in which the photopolymer layer is not provided.

21. The method of preparing the laminated glazing according to claim 1, wherein the border region has a width in a range of 0.5 cm to 5 cm.

* * * * *